Sept. 13, 1932.  J. BERGE  1,876,834
SPRING WASHER
Filed Aug. 12, 1931
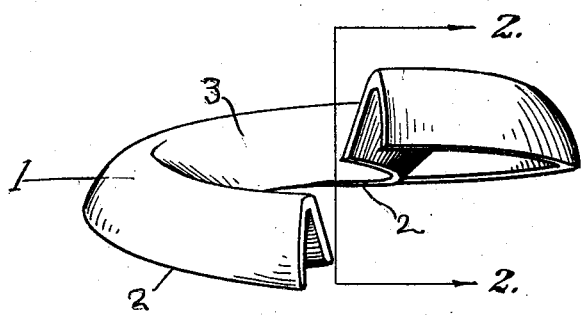
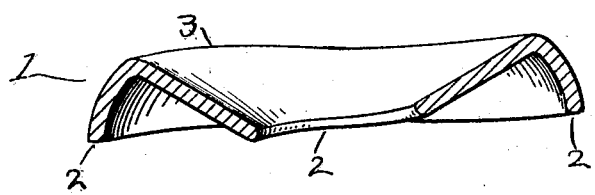
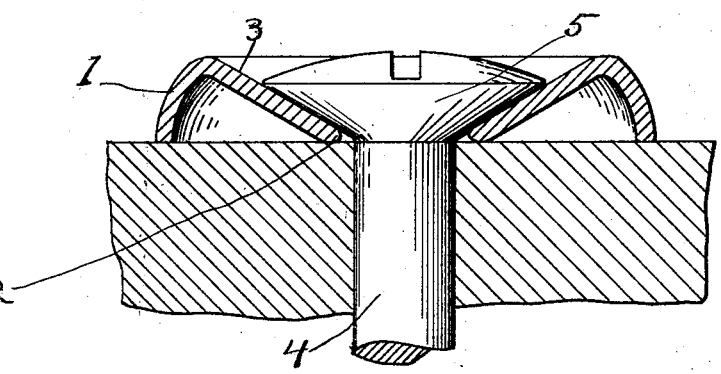
Inventor
Joseph Berge Patented Sept. 13, 1932

1,876,834

UNITED STATES PATENT OFFICE

JOSEPH BERGE, OF MONTCLAIR, NEW JERSEY, ASSIGNOR TO NATIONAL LOCK WASHER COMPANY, OF NEWARK, NEW JERSEY, A CORPORATION OF NEW JERSEY

SPRING WASHER

Application filed August 12, 1931. Serial No. 556,676.

My invention relates to spring washers of helical segment type, and has for its object to so construct the washer that its inner surface will provide a countersink for the head of a bolt or screw, a washer of this construction being for upholstery or for any purpose where the washer is an ornamental feature.

In the accompanying drawing,

Figure 1 is an elevation of the washer—

Figure 2 is a section at the line 2—2 of Figure 1, and

Figure 3 is a sectional elevation showing the manner of applying the washer.

Similar numerals of reference denote like parts in the several figures of the drawing.

1 is the washer which is a spring washer of the helical type and is preferably triangular in cross-section so as to provide a seating surface 2 and a central countersunk portion 3. When this washer is utilized, a bolt or screw 4, whose head 5 is shaped to conform to the portion 3, is passed through the washer into the surface to which the latter is to be fixed, and this head is forced by the clamping action of the part 4 firmly into the washer against the countersink 3, thereby compressing the washer and causing it to exert such resistance against said head as would effectually prevent the latter from turning either if the part 4 was a screw or had its end threaded and engaged by a nut.

This invention affords a construction which when installed, is permanent so far as disarrangement is concerned, and furthermore provides a neat and ornamental appearance with none of the parts projecting so as to be objectionable.

Of course, the washer may be a solid helical segment with its outer face inclined downwardly and inwardly to form the countersink, and the invention is not limited to any special construction so long as it comprises a helical structure with a countersunk upper face.

What is claimed is:—

A spring washer open at its ends and of a helical shape, said washer having its inner face inclined inwardly to provide a countersunk portion adapted to cooperate with a bevel head screw passed within said washer and driven against the latter whereby said washer will be compressed and expanded and caused to exert a force both laterally and outwardly against the bevel head of the screw.

In testimony whereof I affix my signature hereto.

JOSEPH BERGE.